US012508529B2

(12) United States Patent
Carredo

(10) Patent No.: US 12,508,529 B2
(45) Date of Patent: Dec. 30, 2025

(54) COPPER MICROBICIDAL FILTER

(71) Applicant: Carlo Kristian Chu Carredo, Fullerton, CA (US)

(72) Inventor: Carlo Kristian Chu Carredo, Fullerton, CA (US)

(*) Notice: Subject to any disclaimer, the term of this patent is extended or adjusted under 35 U.S.C. 154(b) by 818 days.

(21) Appl. No.: 17/165,885

(22) Filed: Feb. 2, 2021

(65) Prior Publication Data

US 2021/0154610 A1    May 27, 2021

Related U.S. Application Data

(60) Provisional application No. 63/028,610, filed on May 22, 2020.

(51) Int. Cl.
| | |
|---|---|
| *B01D 46/00* | (2022.01) |
| *A41D 13/11* | (2006.01) |
| *A61L 9/014* | (2006.01) |
| *A62B 7/10* | (2006.01) |
| *A62B 23/02* | (2006.01) |
| *B01D 39/08* | (2006.01) |
| *B01D 39/12* | (2006.01) |
| *B01D 39/20* | (2006.01) |

(Continued)

(52) U.S. Cl.
CPC ...... *B01D 46/0028* (2013.01); *A41D 13/1192* (2013.01); *A61L 9/014* (2013.01); *A62B 7/10* (2013.01); *A62B 23/02* (2013.01); *B01D 39/086* (2013.01); *B01D 39/12* (2013.01); *B01D 39/2051* (2013.01); *B32B 5/022* (2013.01); *B32B 5/024* (2013.01); *B32B 5/18* (2013.01); *B32B 15/14* (2013.01); *A61L 2209/14* (2013.01); *A61L 2209/16* (2013.01); *A61L 2209/22* (2013.01); *B01D 2239/0442* (2013.01); *B01D 2239/0613* (2013.01); *B01D 2239/0618* (2013.01); *B01D 2239/065* (2013.01); *B01D 2239/10* (2013.01); *B01D 2275/10* (2013.01); *B01D 2279/35* (2013.01); *B01D 2279/40* (2013.01); *B01D 2279/51* (2013.01); *B01D 2279/55* (2013.01); *B01D 2279/65* (2013.01)

(58) Field of Classification Search
CPC .. A61B 1/24; A61B 1/04; A61B 5/742; A41D 13/11; A41D 13/1176; A41D 13/1107; A41D 31/102; A41D 2500/30; A62B 7/10; A62B 18/084; A62B 23/025
USPC ............................................ 600/199; 128/863
See application file for complete search history.

(56) References Cited

U.S. PATENT DOCUMENTS

| | | | | |
|---|---|---|---|---|
| 3,631,654 A | * | 1/1972 | Riely .................... | B01D 46/10 96/6 |
| 6,471,910 B1 | * | 10/2002 | Haggard ................ | D04H 3/018 425/72.2 |

(Continued)

FOREIGN PATENT DOCUMENTS

| | | | |
|---|---|---|---|
| CN | 104368201 A | * | 2/2015 |
| CN | 206330216 U | * | 7/2017 |

(Continued)

*Primary Examiner* — Alireza Nia
*Assistant Examiner* — Michael Milo
(74) *Attorney, Agent, or Firm* — Barry Choobin; Patent 360

(57) ABSTRACT

The present invention generally relates to an air filter, and in particular, the present invention relates to an air filter with a porous copper layer, having natural antimicrobial property, for improving the quality of air breathed in by people.

17 Claims, 7 Drawing Sheets

(51) Int. Cl.
*B32B 5/02* (2006.01)
*B32B 5/18* (2006.01)
*B32B 15/14* (2006.01)

(56) References Cited

U.S. PATENT DOCUMENTS

| | | | |
|---|---|---|---|
| 2006/0102184 A1* | 5/2006 | Kullik | A61M 16/06 128/207.13 |
| 2012/0285459 A1* | 11/2012 | Sata | F24F 8/80 128/205.27 |
| 2018/0050124 A1* | 2/2018 | Lee | B01J 21/06 |
| 2018/0085697 A1* | 3/2018 | Piry | B01D 46/0028 |
| 2021/0275841 A1* | 9/2021 | Conrad | B03C 3/32 |

FOREIGN PATENT DOCUMENTS

| | | | | |
|---|---|---|---|---|
| CN | 107335598 A | * | 11/2017 | C22C 1/08 |
| KR | 20160004280 U | * | 12/2016 | A62B 23/025 |
| KR | 20170025754 A | * | 3/2017 | A62B 18/02 |
| RU | 158754 U1 | * | 1/2016 | |
| TW | 201501660 A | * | 1/2015 | A41D 31/102 |

* cited by examiner

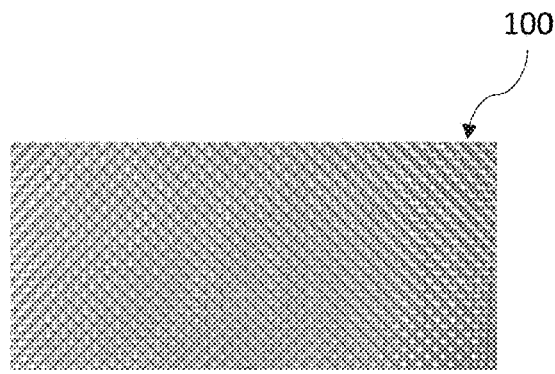
A.
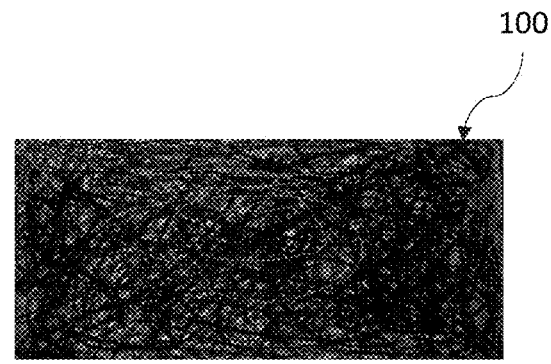
B.
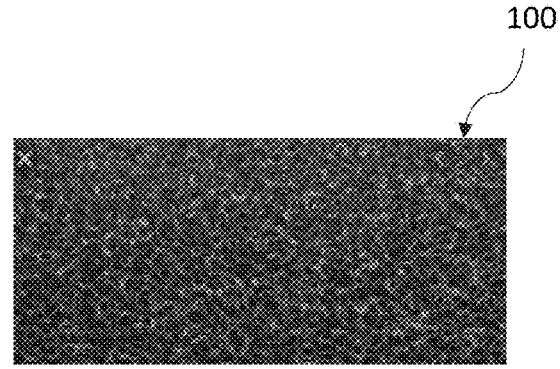
C.
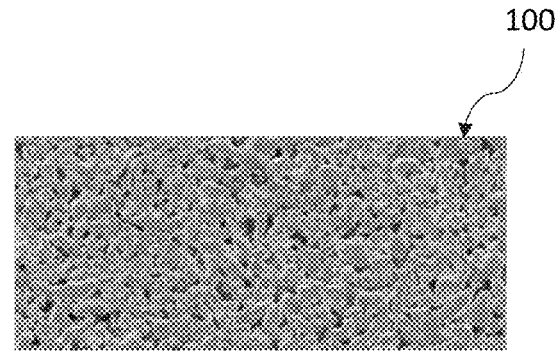
D.
Fig. 1

| January 26, 2021 | | | LMS#6862 |
|---|---|---|---|
| INITIAL 52.2 TEST REPORT *(New Classification)* | | | |
| LMS Technologies, Inc. | | | |
| 6423 Cecilia Circle | | | Tel.: (952) 918-9060 |
| Bloomington, MN 55439 | | | Fax: (952) 918-9061 |
| *Test Type :* | Initial 52.2 | *Test Requested by:* | CMF Filters |
| *Test Number:* | T012621A | *Filter Manufacturer:* | CMF Filters |
| *Flow Rate/Velocity:* | 819 cfm/295 fpm | *Filter ID:* | CMF HVC-2021-1 |
| *Test Aerosol:* | KCl, Neutralized | *Filter Description:* | Orange/Black Panel with Metal Frame |
| *Filter size:* | 20" x 20" x 1" | *Number of Pleats:* | N/A |

| Size Range (μm) | Initial Fractional Efficiency(%) |
|---|---|
| 0.3-0.4 | 0.0 |
| 0.4-0.55 | 0.0 |
| 0.55-0.7 | 3.2 |
| 0.7-1.0 | 11.5 |
| 1.0-1.3 | 31.5 |
| 1.3-1.6 | 51.0 |
| 1.6-2.2 | 72.5 |
| 2.2-3.0 | 87.6 |
| 3.0-4.0 | 95.7 |
| 4.0-5.5 | 98.0 |
| 5.5-7.0 | 98.7 |
| 7.0-10.0 | 99.5 |

Fig. 4

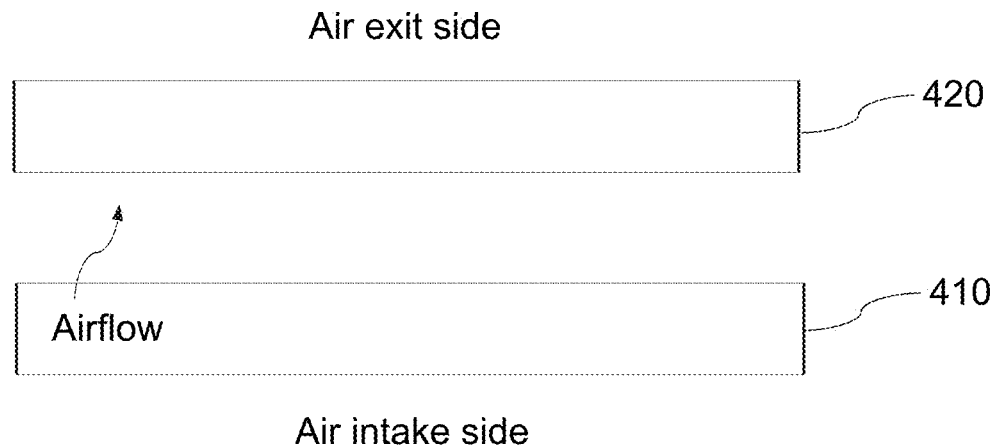
A. Filter frame 400, disassembled.
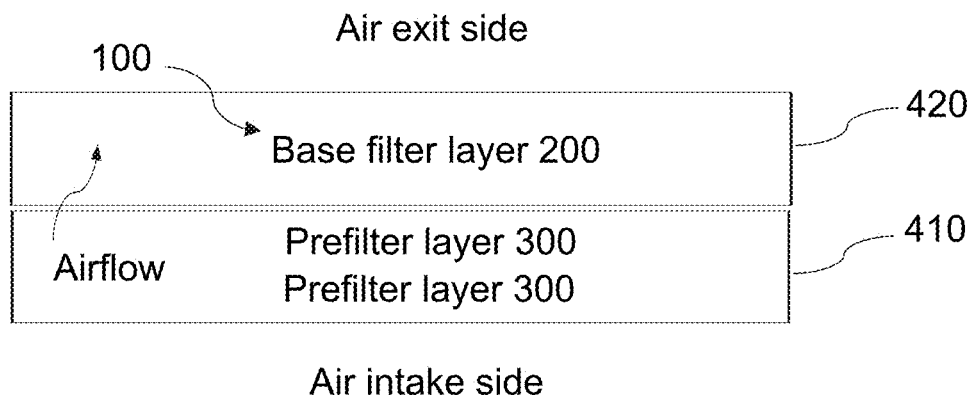
B. Filter frame 400, reassembled.
Fig. 5

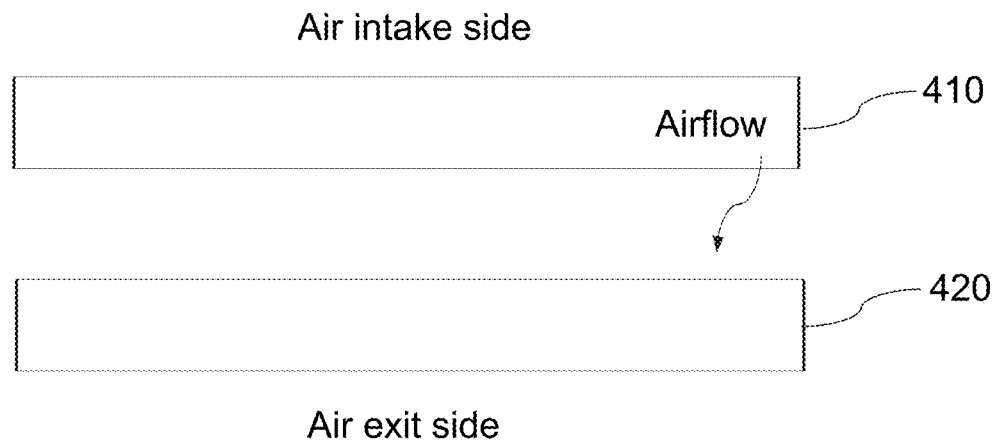
A. Filter frame 400, disassembled.
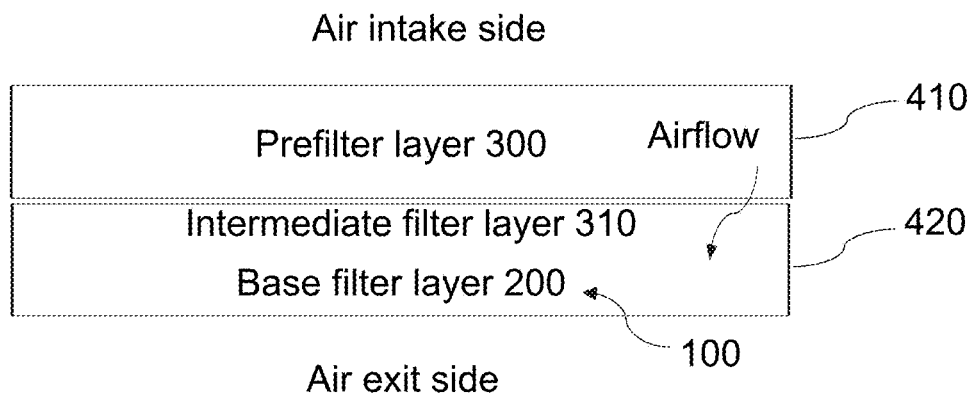
B. Filter frame 400, reassembled.
Fig. 7

COPPER MICROBICIDAL FILTER

CROSS-REFERENCE TO RELATED APPLICATIONS

This application claims priority to the U.S. provisional patent application Ser. No. 63/028,610 filed on May 22, 2020, which is incorporated herein by reference in its entirety.

FIELD OF INVENTION

The present invention generally relates to an air filter, and in particular, the present invention relates to an air filter with a porous copper layer, having natural antimicrobial property, for filtering air suitable for inspiration.

BACKGROUND

The air filter is a device made from porous copper material that removes solid particulates such as dust mites, pollen, molds, bacteria, radioactive materials, smoke, smog, gases, et cetera, out of the air passing through the air filter. The air filter medium can be fibrous or non-fibrous and made of different pore sizes or air spaces. Depending upon the pore size of the non-fibrous air filter medium, the particulate materials suspended in the air having a size bigger than the pore size of the air filter medium are retained by the air filter media while the air passes through the air filter. Air filter medium with fibrous, reticulated meshwork, or composite construction has a depth-based filtration function, the air spaces are typically much bigger than 0.3 microns and yet it can still target a wide range of particle sizes smaller than the air spaces, these particles stick to the air filter media by a combination of filtration mechanics such as direct interception, inertial impaction, diffusion and electrostatic attraction. Conventional air filters are made of less durable and dependable air filter materials such as paper, cotton, glass fibers, melt-blown fibers, spun-bonded fibers, et cetera, which have short filter lives and need to be changed periodically. Frequent changing of air filters is costly and increases the landfill waste from disposable filters.

As the various microbes are captured and retained by the air filter, if not properly handled, the microbes may continue to survive and grow. The growth of microbes decreases the life of the air filters and is one of the reasons, besides filter clogging, for changing the air filters. The presence of alive and growing microbes on the filter medium may contaminate the air and poses respiratory risk.

Thus, a need is always appreciated for an improved air filter medium that not only captures and stores the microbes on the filters but also kills the microbes. A need is appreciated of the air filter that has a longer life than known air filter mediums.

SUMMARY OF THE INVENTION

The principal object of the present invention is therefore directed to an air filter with a porous copper layer having natural antimicrobial and self-sanitizing properties.

It is a further object of the present invention that the air filter is having a longer life than known air filter mediums.

It is an additional object of the present invention that the air filter is safe to use.

It is an another object of the present invention that the air filter enhances quality of air breathed in by people.

It is yet another object of the present invention that the air filter is economical.

It is a further object of the present invention that the air filters are eco-friendly.

It is a further object of the present invention that the air filters are recyclable.

It is still a further object of the present invention that the porous copper layer can be manufactured from conventional and readily available materials and manufacturing processes.

In one aspect, the present invention is directed to an air filter that is having at least one porous copper layer, wherein the copper can be a pure or an alloy of copper.

In one aspect, the at least one porous copper layer can be in the form of copper mesh, fabric, cloth, felt, foam, or sintered porous copper media.

In one aspect, the at least one porous copper layer is manufactured from a copper powder sintering process using copper powder or tiny spheres of copper that are pressed, heated, sintered or bonded together; metal additive manufacturing technology; or via chemical vapor deposition, sintering, casting, coating, electro-plating, copper bonding a non-copper core, et cetera, producing a porous copper structure resembling that of the copper alloy metal.

In one aspect, the air filter can meet air filter testing for performance and compliance to current standards and regulations such as American Society of Heating, Refrigerating and Air-conditioning Engineers (ASHRAE) 52.2 standard and other standards and regulations.

In one aspect, the air filter is a multilayer air filter medium comprising at least one, prefilter layer, intermediate filter layer, base filter layer, and post-filter layer; the prefilter layer, intermediate filter layer, post-filter layer permanently or removably coupled to the base filter layer, the base filter layer comprising the at least one porous copper layer.

In one aspect, the air filter is a multilayer air filter medium wherein the at least one porous copper layer is the prefilter layer, intermediate filter layer, or post-filter layer.

In one aspect, the air filter is a multilayer air filter medium wherein the prefilter layer, intermediate filter layer, post-filter layer comprising the at least one porous copper layer permanently or removably coupled to a base filter layer, the base filter layer is any known air filter or filter material.

In one aspect, the device is a face mask or face portion of the PPE kit with an air filter comprising:
 at least one porous copper layer.

In one aspect, the device comprising an air filter, the air filter comprises:
 at least one porous copper layer for filtering air suitable for inspiration.

In one aspect, the at least one porous copper layer can be produced from a woven copper wire mesh, fabric or cloth that has great stability and mechanical strength.

In one aspect, the at least one porous copper layer can be produced from nonwoven copper fiber felt that has superior filtration function.

In one aspect, the at least one porous copper layer can be produced from copper-sintered-foam or open-cell copper foam that can be compressed to achieve higher densities and smaller pore sizes.

In one aspect, the at least one porous copper layer can be produced from powdered sintered porous copper media or 3D-printed porous copper media that has exceptional durability and efficiency.

These and other objects and advantages of the embodiments herein will become readily apparent from the following detailed description.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

FIG. 1 which shows an implementation of the air filter medium comprising at least one porous copper layer. FIG. 1A shows a layer of woven copper wire mesh. FIG. 1B shows a layer of nonwoven copper fiber felt. FIG. 1C shows a layer of open-cell copper foam. FIG. 1D shows a layer of sintered porous copper media.

FIG. 4 shows a fractional efficiency of the exemplary filter as a function of particle diameter based on initial ASHRAE 52.2 standard test.

FIG. 5 which shows the exemplary embodiment of an HVAC/Furnace air filter comprising two prefilter layers 300, base filter layer 200 comprising the porous copper layer 100, and filter frame 400. FIG. 5A. shows a disassembled filter frame 400. FIG. 5B. shows a reassembled filter frame 400. With the airflow arrow marking on the frame pointing up, the bottom portion is the air entry side 410 and the top portion is the air exit side 420.

FIG. 7 which shows the exemplary embodiment of a vehicle passenger cabin air filter comprising a prefilter layer 300, intermediate filter layer 310, base filter layer 200 comprising the porous copper layer 100, and filter frame 400. FIG. 7A. shows a disassembled filter frame 400. FIG. 7B. shows a reassembled filter frame 400. With the airflow arrow marking on the frame pointing down, the top portion of the frame is the air entry side 410 and the bottom portion is the air exit side 420.

DETAILED DESCRIPTION

Figure 2:
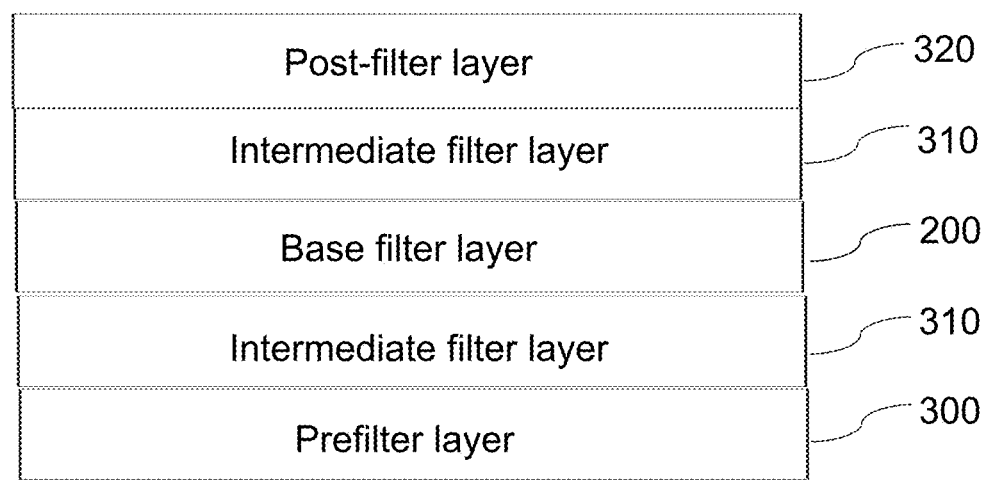
FIG. 2 shows a multilayer air filter medium, according to an exemplary embodiment of the present invention, comprising at least one, prefilter layer 300, intermediate filter layer 310, base filter layer 200, and a post-filter layer 320.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as devices and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details.

Copper is the oldest metal known to man for nearly five thousand years, and thus had all the metal applications man can think of. It has been indispensable in improving the lives of people and has a wide range of positive benefits since the dawn of human civilization. When it comes to corrosion resistance, copper is among the top of the list of inert noble metals, including, gold, silver, and platinum. They will resist deterioration and stand the test of time. Take the Statue of Liberty as an example, it has been around since 1885. It represented the largest use of copper in a single structure which could make 30 million pennies. Another concrete evidence for copper's excellent corrosion resistance is the copper artifacts found by archaeologists that were at least 8,000 years old. Copper coins were also found in shipwrecks that remained intact after thousands of years. Over the years or decades, copper may weather and create a thin layer of patina (which causes the changing of color of the statue to green), it wasn't meant decaying of the statue but actually it protects the copper underneath from further corrosion. Copper is as safe, durable and dependable as copper evaporator coils in air conditioners, which are made of copper tubes, they have been operating for decades without any problems. As air moves over the coils, the refrigerant within the coils absorbs the heat from home's air, and the cold air passing across those coils, is the air that is blown out to the vents which is literally the air that we are breathing in. Copper can be renewed to its original form and luster by simply cleaning the filter with the help of common household items such as white vinegar and table salt. It can be recycled and reclaimed for scrap value. Copper air filters generally comprise a sturdy metallic skeletal structure, regular or repeated washing will not alter its geometric integrity or efficiency rating.

A radioactive material can land like dust on objects and contaminate the same way that normal dust or dirt tracked into the house or spread to another person or object and surfaces. It has been known that copper can block much of the harmful radioactive radiation. In this context, we can think of copper as a promising air filter material for "gas mask", escape respirator, powered air-purifying respirators (PAPRS), supplied-air respirators, self-contained breathing apparatus (SCBA), combination respirators, face portion of the PPE suit and et cetera, for it can capture radioactive, chemical and biological contaminants, as well as block radioactive radiation reaching through the filter. Therefore the face portion of the PPE kit with a copper air filter installed along with a PPE suit that is made of copper-enhanced fabric material would provide a complete protection against radiological, chemical and biological contamination.

The present invention is directed to an air filter with at least one porous copper layer, having natural antimicrobial property, for improving the quality of air breathed in by people. In one implementation, the at least one porous copper layer can be a pure or an alloy of copper. It can be produced from conventional and readily available materials and manufacturing processes without the need for a new production technology. In one implementation, the at least one porous copper layer is manufactured from a copper powder sintering process using copper powder or tiny spheres of copper that are pressed, heated, sintered or bonded together; metal additive manufacturing technology; or via chemical vapor deposition, sintering, casting, coating, electro-plating, copper bonding a non-copper core, et cetera, producing a porous copper structure resembling that of the copper alloy metal.

In one implementation, the at least one porous copper layer is a woven copper wire mesh, fabric or cloth. The woven copper wire mesh, fabric or cloth is sintered, diffusion bonded or welded together giving it an enhanced stability and high mechanical strength. Sintering does not change the physical properties of copper. The wire mesh, cloth, or fabric can be constructed of various aperture sizes, weave patterns and filter combinations giving the mesh a specific micron rating. In one implementation, the at least one porous copper layer is a random copper fiber felt or nonwoven copper felt that can capture particles as low as 0.1 micron or smaller than the air spaces of the copper felt medium by a combination of filtration mechanics. It is a three-dimensional filtration media, made of hundreds of randomly arranged strands of copper fibers that removes particulate materials through depth-based filtration. The numerous individual strands of copper fibers are pressed, heated, and bonded together to form a filter with randomized pore openings small enough to deliver high-quality filtration. Manufacturing processing can control its micron rating and filtration efficiency. As with other porous metal filters, copper felt filters are cleanable and their fine air spaces are hard to compromise. Even if fibers fall out of place during cleaning, it can still maintain its rated efficiency. In one implementation, the copper felt is either a single or multi-layered felt. In one implementation, the at least one porous copper layer is an open-cell copper foam. Open-cell copper foams have reticulated, pentagonal, dodecahedron geometric foam structure comprising a pure or alloy of copper with a large volume fraction of air-filed pores. It can be manufactured via powder metallurgy, additive manufacturing technology, chemical vapor deposition, sintering, casting, coating, electro-plating over a non-copper core, et cetera, producing a porous copper foam structure resembling that of the copper alloy metal, with no voids, inclusions, or entrapments. The matrix of cells and ligaments are completely repeatable, regular and uniform throughout the entirety of the filter material. Its intricate lattice-like inner structure has a rigid, highly porous and permeable structure. The porosity of open-cell foams is measured in pores per inch (PPI) which designates the number of pores in one linear inch. Open-cell copper foams can be compressed to achieve higher densities and smaller pore sizes of up to 100 plus pores per inch (PPI). The pores per inch (PPI) correlates well with an airflow tested measurement defining a range of airflow for a given porosity. The porosity of open-cell copper foams can be adjusted along with the thickness and number of layers to increase the dirt holding capacity, percent arrestance, filtration efficiency, desired airflow, and et cetera. Metal foam or sponge, in general, has very large surface area per unit weight than other porous metals. Unlike normal air filters which only block particles on the surface of the air filters, open-cell copper foam filters retain particles through depth filtration and have superior dirt holding capacities. Metal foams such as the open-cell copper foams generally retain most or some of the physical properties of the base metal. Open-cell copper foams can be washed and reused. It can be renewed or restored into its original form by using common household items such as vinegar-salt solution, or tarnish remover and other cleaning agents. Copper foam has a good machinability, it can be cut pressed perfectly. It is recyclable and can be reclaimed for scrap value. If reclaimed and returned to original process, it can be used as electrodes for batteries, heat exchangers, muffling, electromagnetic shielding, shock absorption, energy absorption, buffering, and other filtration applications. In one implementation, at least one porous copper layer is a powdered sintered porous copper media or sintered porous copper media fabricated from a copper powder sintering process using copper powder or tiny spheres of copper that are pressed, heated, sintered or bonded together. It can also be produced via metal additive manufacturing technology otherwise known as 3D printing and other methods. It has excellent durability, efficiency and reliable long filter life. It can be repeatedly washed and reused.

Referring to FIG. 1 which shows an implementation of the air filter medium comprising at least one porous copper layer. FIG. 1A shows a layer of woven copper wire mesh. FIG. 1B shows a layer of nonwoven copper felt. FIG. 1C shows a layer of open-cell copper foam. FIG. 1D shows a layer of sintered porous copper media.

In one implementation, the air filter comes in a wide range of configurations such as: disc, panel, pleated, corrugated, media air filter; housed in cartridge, canister, rigid box; fabricated as pocket or bag filters, rigid cell, v-cells, and et cetera. The air filters are pleated, formed into numerous folds or otherwise shaped to increase the surface area to volume flow rate. Increasing the surface area enhances the efficiency of filtration and reduces the resistance to airflow. With respect to foam air filters, the porosity, thickness, density, and number of layers are adjusted to increase efficiency rating, dust holding capacity, percent arrestance, desired airflow, and et cetera. Furthermore, some individual air filter in cells can only accommodate certain airflow capacity, therefore in order to meet airflow requirements, the air flow capacity is increased by housing multiple filters in modules or banks and are ducted together.

In one implementation, the air filter frame or housing can be made from a wide variety of materials such as ABS plastic, vinyl, aluminum, galvanized, painted and stainless steel, et cetera. The frame or housing can be configured to be disassembled and reassembled, constructed with removable screws, hinged door, or any disassembling and reassembling mechanisms which offer a replaceable air filter media.

In one implementation, the present invention is embodied in a face mask or face portion of the PPE kit with an air filter comprising at least one porous copper layer. In one implementation, the device comprising an air filter, the air filter comprises at least one porous copper layer. The device is HVAC/Furnace (rooftop, portable, wall-mounted, and the like), vehicle passenger cabins (automotive, locomotives, rail passenger cars, ship, aircraft, spacecraft, and the like), wall or window air conditioner, portable air conditioner, humidifier, air cooler and heater, vacuum cleaner, fan coil filter unit, hood ventilation system, laminar airflow system, anesthesia breathing circuit apparatus, central-wall suction units in operating rooms, nebulizer, oxygen concentrator, respirators such as facepiece respirators, continuous positive airway pressure therapy (CPAP) mask, bilevel positive airway pressure (BIBAP) mask, "gas mask", escape respirator, airline respirators, powered air-purifying respirators (PA-PRS), supplied-air respirators, self-contained breathing apparatus (SCBA), combination respirators, and et cetera. In one implementation, the device is a mechanical ventilator, the device further comprises a heat moisture exchanging filter or replaceable air filter connected to the facepiece respirator, prefilter, and expired gas filter. The air filter can be used in homes, commercial establishments, hospitals, medical clinic, offices, chemical and pharmaceutical laboratories, clean rooms, nuclear rooms, electronic facilities, industrial buildings, food service, food processing facilities, automotive, aircraft, spacecraft, and et cetera.

In one implementation, the air filter meets air filter testing for performance and compliance to current standards and regulations such as: American Society of Heating, Refrigerating and Air-conditioning Engineers (ASHRAE 52.2), ISO 16890-2 for ventilation filter testing; National Institute for Occupational Safety and Health (NIOSH) for face mask and respirator testing; US 42 CFR 84, GB2626, EN 143/149, ISO 16900-3 for respiratory filter testing; cabin air filter testing; AHAM AC-1-2013, GB/T 18801-2015 for air cleaner testing; EN 1822-3/5, MIL STD for HEPA and ULPA filter and filter media testing; and other standards and regulations.

In one implementation, the air filter comprising at least one porous copper layer is a single-layer air filter medium. An exemplary single-layer air filter medium comprises a powdered sintered porous copper media, 3D printed porous copper media, or open-cell copper foam. In one implementation, the air filter comprise a shape configured to orient the air filter within the device such as disc and panel shapes. The air filter is applied to the following devices comprising an air filter: wall or window air conditioner, portable air conditioner, humidifier, air cooler and heater, vacuum cleaner, anesthesia breathing circuit apparatus, central-wall suction units in operating rooms, nebulizer, oxygen concentrator, mechanical ventilator, face mask, respirators, and et cetera. In one implementation, the air filter comprises other form or type of porous copper layer such as copper felt, mesh, cloth, or fabric.

In one implementation, the air filter is a multilayer air filter medium comprising at least one, prefilter layer, intermediate filter layer, base filter layer, and post-filter layer; the prefilter layer, intermediate filter layer, post-filter layer permanently or removably coupled to the base filter layer, the base filter layer comprising the at least one porous copper layer. In one implementation, the prefilter layer, intermediate filter layer, or post-filter layer comprises any air filter, air filter material, or the at least one porous copper layer.

FIG. 2 shows the multilayer air filter medium, according to an exemplary embodiment of the present invention, comprising at least one, prefilter layer 300, intermediate filter layer 310, base filter layer 200, and post-filter layer 320.

An exemplary multilayer air filter medium is a five-layer sintered and laminated woven copper wire meshes, cloth, or fabric, comprising a prefilter layer 300, two intermediate filter layers 310, base filter layer 200, and post-filter layer 320. The prefilter layer 300, two intermediate filter layers 310, and post-filter layer 320 are permanently applied to the base filter layer 200. The two intermediate layers 310 are applied adjacent to the base filter layer 200 and post-filter layer 320. The layers comprise different weave patterns, pore sizes, with varying functions, construction, thickness, and et cetera. The dust and dirt accumulate on the prefilter layer 300 than on the base filter layer 200. It blocks dirt and grime that may impede microbial contact on the inner base filter layer 200. The prefilter layer protects the intermediate and inner layers from early filter clogging. The prefilter layer 300 and intermediate layer 310, in general, are for stability or reinforcement, while the base or main filter layer 200 is for filtering tiny particles and is the main filtering portion of the air filter. In one implementation, the multilayer air filter medium comprises at least one form or type of porous copper such as mesh, felt, foam, sintered porous copper media, and et cetera. An exemplary multilayer air filter medium is a three-layer air filter comprising a prefilter layer 300 constructed of a copper mesh, base filter layer 200 constructed of copper felt, and post-filter layer 320 constructed of a copper mesh.

Figure 3:
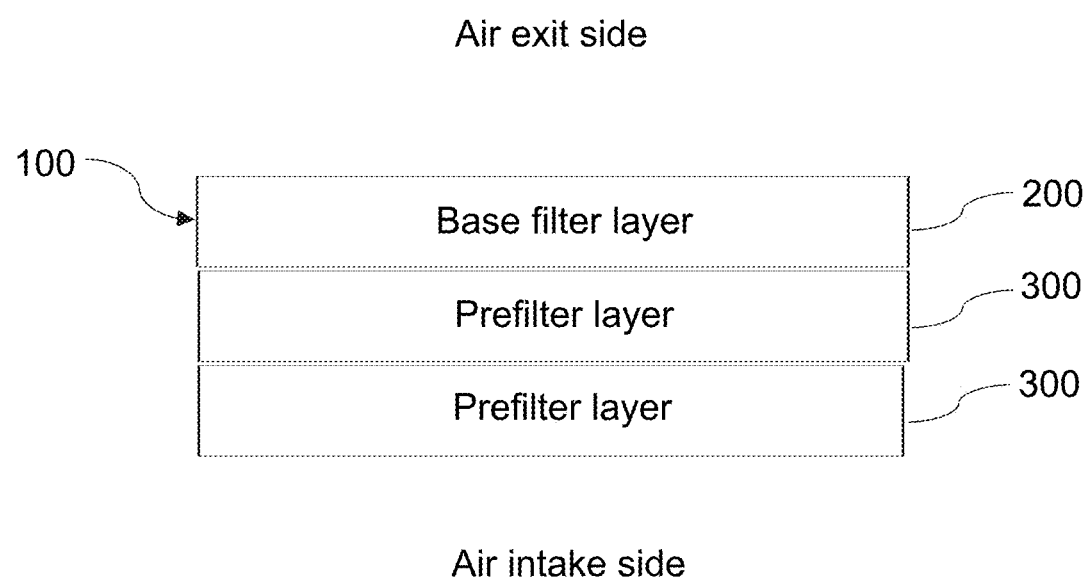
FIG. 3 shows two prefilter layers 300, according to an exemplary embodiment of the present invention, applied to the base filter layer 200 comprising the porous copper layer 100.

In one implementation, the multilayer air filter medium comprises at least one porous copper layer and at least one non-copper filter layer, the non-copper filter layer comprises a non-copper porous metal or synthetic air filter material such as polypropylene, polyester, polyurethane, silicone, nylon, et cetera. In one implementation, the multilayer air filter medium comprises two prefilter layers 300 and one base filter layer 200, the prefilter layers 300 removably coupled to the base filter layer 200, the base filter layer 200 comprising the porous copper layer. FIG. 3 shows two prefilter layers 300, according to an exemplary embodiment of the present invention, applied to the base filter layer 200 comprising the porous copper layer 100. An exemplary multilayer air filter medium is an HVAC/Furnace air filter comprising a three-layer open-cell filter foam media. The first and second layers comprise the two prefilter layers 300 constructed of synthetic foam filter materials, and a third layer comprises the base filter layer 200 constructed of an open-cell copper foam. Open-cell copper foams are purchased in sheets and cut using existing industrial shearing or cutting machines to fit into the HVAC/Furnace frame or housing. The exemplary air filter medium measured 19⅝" times 19⅝" times ⅞" (L×W×D) that fits into a 20" times 20" times 1" filter frame. An initial ASHRAE Standard 52.2 testing—(New Classification) was run on the exemplary HVAC/Furnace filter.

FIG. 4. shows a fractional efficiency of the exemplary HVAC/Furnace filter as a function of particle diameter based on initial ASHRAE Standard 52.2 test.

Minimum Efficiency Reporting Value or MERV is a standard measurement scale designed by the American Society of Heating, Refrigerating, and Air-Conditioning Engineers (ASHRAE) to evaluate the efficiency of an air filter based on how efficient it is at capturing particles of varying sizes. The higher the MERV designation, the better the efficiency of removal, particularly for smaller particles. MERV levels 1 through 16 are determined using full ASHRAE Standard 52.2 test. Standard 52.2 does not address High Efficiency Particulate Air (HEPA) filters or Ultra Low Penetration Air (ULPA) filters (MERV 17-20). Instead, HEPA/ULPA filters are assigned MERVs based on their performance in accordance with standards published by the Institute of Environmental Sciences and Technology (IEST). MERV helps consumers choose the right air filter they need. For example, MERV 1-4 filters capture particles that are 10 microns or larger and has minimum indoor air quality (IAQ) impact. MERV 5-8 filters provide a good level of filtration catching small particles (3-10 microns) like mold spores, hair spray, dust mites and animal dander. MERV 9-12 air filters are ideal for residential use. They can remove contaminants as small as small as 1-3 microns, which includes auto emissions and the bacteria *Legionella*. MERV 13-16 filters are usually used in hospitals because they can filter particles as small as 0.03-1 micron in size such as solitary and aggregates of bacterial cells, mold spores, and virus carriers.

The exemplary air filter is housed in a frame that can be disassembled and reassembled which offer easy access, removal, cleaning and changing of the air filters. Reassembling the air filters is as easy as stacking filter foams sheets into the frame.

Referring to FIG. 5. which shows the exemplary embodiment of an HVAC/Furnace air filter comprising two prefilter layers 300, base filter layer 200 comprising the porous copper layer 100, and filter frame 400. FIG. 5A. shows a disassembled filter frame 400. FIG. 5B. shows a reassembled filter frame 400. An airflow arrow is marked on the side of the filter frame indicating that the arrow should always point to the blower motor at all times during installation. With the airflow arrow pointing up, the bottom of the frame is the prefilter or air entry side 410 and the top is blower motor or air exit side 420.

The prefilter layers 300 increase the life of the base filter layer 200. They are constructed of bigger pore sizes or smaller PPI that can block larger particulate matters (PMs). It also protects the copper base filter layer 200 against dirt and grime that may impede the contact of bacteria on the copper surface, keeping the copper filter to continuously perform its self-sanitizing action. Copper air filter is desirable over traditional air filters because it is durable, dependable, exceptionally corrosion resistant, moisture and wear resistant, safe, washable, reusable, sustainable, antimicrobial, self-sanitizing, long useful life, economical, eco-friendly, and recyclable.

Figure 6:
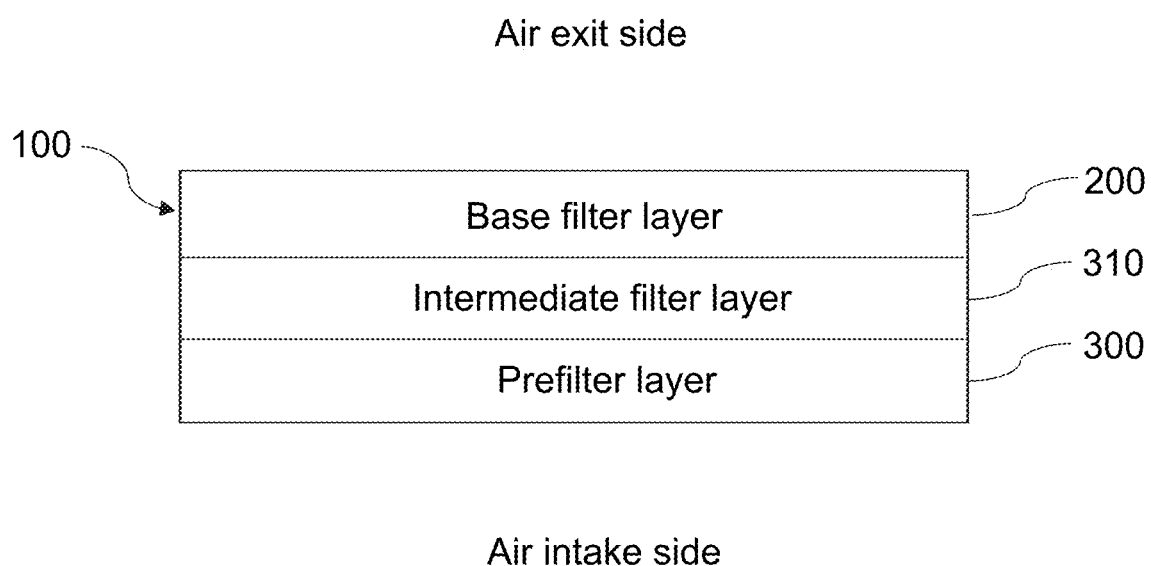
FIG. 6 shows a prefilter layer 300 and intermediate filter layer 310, according to an exemplary embodiment of the present invention, applied to the base filter layer 200 comprising the porous copper layer 100.

In one implementation, a multilayer air filter medium comprises a prefilter layer 300, intermediate filter layer 310, and a base filter layer 200, the prefilter layer 300 and intermediate filter layer 310 removably coupled to the base filter layer 200, the base filter layer 200 comprising the porous copper layer 100. FIG. 6 shows a prefilter layer 300 and intermediate filter layer 310, according to an exemplary embodiment of the present invention, applied to the base filter layer 200 comprising the porous copper layer 100.

An exemplary air filter is a washable and reusable cabin air filter with dimensions of 215 mm times 193 mm times 29 mm (L times W times D). It comprises a multilayer air filter medium design adapting the multistage air filtration system of air purifiers: first layer or prefilter layer 300, comprises a replaceable, washable synthetic foam prefilter; second layer or intermediate filter layer 310, comprises a replaceable/refillable activated carbon foam filter; third layer or base filter layer 200, comprises a replaceable and washable open-cell copper foam or the porous copper layer 100. The frame construction is similar to the exemplary HVAC design. The air filter layers can be removed from its frame and washed as necessary. The activated carbon filter layer once saturated, it cannot be reused. Since the removable filter frame design offer a replaceable activated carbon filter layer, it would then be possible to replace the activated carbon component in such air filter. Referring to FIG. 7 which shows the exemplary embodiment of the cabin air filter comprising a prefilter layer 300, intermediate filter layer 310, base filter layer 200 comprising the porous copper layer 100, and filter frame 400. FIG. 7A. shows a disassembled filter frame 400. FIG. 7B. shows a reassembled filter frame 400. With the airflow arrow marking on the filter frame pointing down, the top portion of the frame is the air entry side 410 and the bottom portion is the air exit side 420.

Having a washable and reusable air filter will make the servicing of the air filter up on, greatly reducing the buildup of dirt and microbes on the filters. The rate of filter clogging of the intermediate filter layer 310 or activated carbon layer is reduced because of the protection provided by the prefilter layer 300, while the rate of filter clogging of the base filter layer 200 is also reduced by the protection provided by both the prefilter layer 300 and intermediate filter layers 310 (a.k.a. progressive filtration). The antimicrobial property of copper preserves the base filter layer 200 by preventing the growth of microbes on the filter, extending its useful life. The prefilter layer 300 captures larger air particles such as dust, dirt and grime; activated carbon filter or intermediate filter layer 310 captures smoke, smog, fumes, and odors; and the copper base filter layer 200 captures very fine particles such as mold spores, bacteria, auto emissions, et cetera. As the cabin air filter loads up with dirt and impurities, evidence of reduction in the efficiency of heating or cooling from the AC and airflow, >12,000 mileage or more than a year of use, presence of odor that does not dissipate, exhaust fumes exiting from the air vents, declining air quality, etc., the air filters need to be cleaned or replaced. The porous copper filter can be cleaned with warm soapy water, and when it is necessary to remove the tarnish from the filter, it can be renewed to its original form and luster by simply cleaning the filter with the use of common household items such as white vinegar and table salt. With copper's exceptional corrosion resistance and dependable long filter life, the air filter could last across generations. If the prefilter foam is torn and worn out it just need to be replaced and the device can be used again, transferred to another vehicle, auctioned for secondhand sale, or inherited to the next generation.

In one implementation, the air filter is a multilayer air filter medium wherein the prefilter layer 300, intermediate filter layer 310, post-filter layer 320 comprising the at least one porous copper layer permanently or removably coupled to a base filter layer 200, the base filter layer 200 is any known air filter or filter material. An exemplary embodiment of the air filter is a multilayer air filter medium comprising a prefilter layer constructed of a copper mesh or cloth, or copper felt, laminated or contoured to the pleats of a HEPA filter medium.

As we all know, the natural antimicrobial and self-sanitizing properties of copper has been known since the ancient times. This innate antimicrobial property has something to do with copper's atomic structure, in its atom, a sufficient number of free electrons are present in the outermost shell that can take part so quickly in oxidation-reduction reactions. When microbes land on copper's surface the metal releases copper ions (electrically charged particles) that punches holes into the bacterial cell membranes and disrupt the viral coats, destroying the DNA and RNA inside. Pathogens therefore cannot function or reproduce, nor undergo mutation and become resistant to copper.

Research by independent laboratories has found *Aspergillus, S. aureus, Mycobacterium tuberculosis*, viruses and others are growing on the HVAC and ventilation systems in healthcare facilities. In similar situations, a strain causing an outbreak was recovered from the air. The emergence of antimicrobial resistant superbugs such as Methicillin-resistant *Staphylococcus aureus* (MRSA), Vancomycin-resistant *Enterococcus* (VRE) and other notorious pathogens that cause healthcare associated infections (HAIs) has caused widespread concern. Proper handling of ventilation systems can potentially reduce the transmission of airborne pathogens. It was reported that copper and copper alloys have the capacity to neutralize antibiotic-resistant microorganisms. The U.S. Environmental Protection Agency (U.S. EPA), after rigorous testing and evaluation, has found 500+ copper alloys including many brasses to kill more than 99.9% of disease-causing bacteria within just two hours of contact, provided the metals are free of dirt or grime that may impede the bacteria's contact with the copper surface. It was reported that copper's efficacy does not wear out over time and continues to kill microbes. Even after repeated contamination of copper surfaces, copper still continues to work 24 hours a day. According to EPA, if used as intended, copper alloys with antimicrobial property are wear-resistant and the durable antibacterial properties will remain effective for as long as the product remains in place and is used as directed. Extensive laboratory testing supervised by EPA has proven that antimicrobial copper alloys continuously kill various microorganisms and are safe to use. EPA cited that all of the alloys have minimum nominal copper concentrations of 60%. Microbes tested and killed in EPA laboratory tests include: *Escherichia coli* O157:H7, Methicillin-resistant *Staphylococcus aureus* (MRSA), *Staphylococcus aureus, Enterobacter aerogenes, Pseudomonas aeruginosa*, and Vancomycin-resistant *Enterococcus* (VRE). Normal tarnishing was found not to impair copper's antimicrobial effectiveness. With respect to COVID19, as per CDC's report it is approximately 0.125 micron in size. Some independent laboratory experiments revealed that respiratory viruses including coronaviruses were rapidly inactivated within minutes by copper surfaces. According to EPA, considering the limited evidence against SARS-CoV2, further testing would be required to assess the effectiveness of copper surfaces. Manufactured products using the present technology will not make any public health claims relating to antimicrobial activity of copper without first obtaining an EPA registration for the manufactured product.

Microbes suspended in air are drawn into the air filter. As they pass through the air filter, the microbes are collected on the surface or inner structure of the air filter media by sieving and other mechanisms. If not properly handled, the microbes may remain viable and proliferate. The air may be contaminated and the microbes will be blown out to surrounding surfaces and objects such fan blower, evaporator cooling coils, HVAC ductwork, drip pans (with stagnant water), return air drill, diffusers, dampers, ventilation ducts, and filtration airflow. This may pose a serious health risk to occupants or patients breathing poor air quality. The growth of microbes also generates high flow rates, high energy consumption, and causes the system or equipment to work inefficiently and even damages it. Since many respiratory infections appear to occur when pathogens are suspended in the air and inhaled into the lungs, a properly handled air filter or ventilation systems therefore would potentially lower the risk of secondary bioaerosol transmission from contaminated filters and airflow. It may potentially lower the risk of healthcare-associated infections (HAIs) and spread of dangerous pathogens during outbreaks and pandemics. With respect to the recent COVID19 pandemic, ASHRAE provided guidelines on how to help reduce COVID19 transmission. One of the guidelines suggested was using at least a MERV 13 or a HEPA filter if possible.

Now referring again to FIG. 1, which show an embodiment of the air filter media comprising a porous copper layer 100 as a layer of woven copper mesh (FIG. 1A), nonwoven copper felt (FIG. 1B), open-cell copper foam (FIG. 1C), or sintered porous copper media (FIG. 1D).

As microbes suspended in air pass through the porous copper layer 100, a fraction of the microbes are collected on the surface and internal structure of the porous copper layer 100, by sieving and other mechanisms. The contact of the microbe on the copper filter media, causes the microbe to break apart over time due to "contact killing" or an ionic interaction of the copper material with the microbe. The neutralization of the microbe prevent it from growing and propagating on the air filter, contaminating the air and spreading to distant places. The air filter would serve as a useful infection control measure particularly in dealing with healthcare-associated outbreaks. Moreover, infectious aerosols such as viruses disseminate and mutate so rapidly, making it difficult for vaccines to keep up. Bacteriophage, antibiotic-resistant microorganisms and some viruses can escape HEPA air filters as they are only captured or stored in the filter but not neutralized, giving them the chance to survive and grow on the filter.

The microbial sieving ability of the air filter depends on the MERV, the higher the MERV or efficiency (MERV 13 and higher), the more efficient is the trapping of microbes and the more is the microbicidal effect. For example, a MERV 13 version of the air filter would efficiently capture particles with size 0.3-1.0 microns including solitary and aggregates of bacterial cells or spores, droplet nuclei (virus carriers), and mold spores. The high-efficiency particulate air (HEPA) version of the air filter, on the other hand, would remove at least 99.97% of particles from the air that passes through the air filter whose diameter is equal to 0.3 micron. Traditional HEPA filters are constructed of fiberglass or polypropylene filter materials and typically operated under controlled pressure because high operating pressure may rupture the filter. HEPA filters are primarily used in critical applications because they have much greater particulate retention rate for microscopic particulate matters (PMs). The dense fibers that make up these filters create a marked drop in pressure, thus in some institutions the large drop in pressure was compensated by adding or using a stronger and more efficient blower motor to maintain the filtration air flow. Restrictive air filters can overwork the system and lead to inefficient equipment operation and premature failure. The system would also try to generate enough power to move the air through the filter, increasing energy consumption. Thus, in some isolation rooms a MERV 14 is used instead of a HEPA filter. Most residential and large buildings, however, are not compatible with HEPA filters, it can only adapt to MERV 1-16 air filters. For this reason, the use of HEPA filter is limited only to commercial and industrial than residential applications. In one implementation, the MERV 13-16 version of the air filter can be used to provide adequate contamination and infection control in medical environments while not having the compromised air restriction constraint which is so common to HEPA filter designs. From now on, a medical grade air filter will also be available for use in residential and non-medical HVAC systems.

Since HEPA filters cannot prevent transmission of bacteriophages, antibiotic-resistant bacteria, and some viruses, most air purifiers are supplemented with another air sterilization method, such as an Ultraviolet Germicidal Irradiation (UVGI) technology to compensate this limitations. Using the HEPA version or highly efficient version of the air filter would solve this technical problem. The air filter would contribute better infection control in hospitals such as intensive care units (ICUs). The air filter is also suitable for various biomedical applications. Take mechanical ventilators as an example, these devices consist of air filters that can be potentially serve as polluting sources of secondary bio-aerosols or pathogens to patients. Mechanical ventilators have air filters at three different sites in the respiratory circuit, i.e. at the gas intake site, at the patient and at the expiratory circuit. The prefilter is at the gas intake site of the respiratory circuit, while the heat moisture exchanging filter device or replaceable air filtering device connected to the facepiece respirator, is at the patient, and the expired gas filter device is at the expiratory end of the circuit. Possible contamination of the inspired gas could include microbes and particles from the supply pipes and CO2 absorber canisters. Filtration of the supplied gas that passes through the prefilter prevents microbial contamination of the inspiratory limb. On the other hand, contamination of expired gas could include microbial pathogens or expired particles from an intubated patient. Filtration of the expired gas prevents microbial contamination of the ventilator and the ambient air, protecting healthcare workers and other patients. The use of the copper air filter in mechanical ventilators would therefore potentially reduce or prevent the spread or transmission of ventilator-associated respiratory (VAP) infections and health care-associated infections (HAIs), especially in outbreaks and pandemics where critically-ill patients are normally hooked to mechanical ventilators. An exemplary air filter is a single-layer open-cell copper foam or sintered porous copper media comprising a shape configured to orient the air filter within the device.

In one implementation, the air filter comprising the at least one porous copper layer is incorporated into an air cleaning device comprising at least one air filter as prefilter layer, intermediate filter layer, base filter layer, and postfilter layer. The exemplary air cleaning device is media air cleaner, air purifier, HVAC duct-mounted air purification system, and any other air cleaning device. In an HVAC duct-mounted air purification systems, the media air cleaner sits inside the HVAC ductwork, and cleanse the air that circulates throughout the home. The copper air filter will not only remove and store the microbes on the filter but kills them. In one implementation, the air filter is the prefilter layer removably coupled to a base HEPA filter layer. The advantage of having a copper prefilter is that it doesn't get moldy over time and it will last a long time. Since HEPA air filters have limited protection against bacteriophages, antibiotic-resistant bacteria, and some viruses, adding a copper air filter before it would complement HEPA air filters in dealing with these pathogens. In one implementation, the air filter is incorporated into a device comprising both an air filter and a non-filtration method of air sterilization. An exemplary embodiment of the device is an air purifier or HVAC duct-mounted air purification system comprising the at least one porous copper layer and a non-filtration method of air sterilization such as UVC-light, ionizer, and et cetera.

Recycled scrap metal is excluded by federal regulations, and is not considered a waste in California under certain conditions. According to state regulations, excluded and exempted waste includes certain recyclable materials, such as substitutes for commercial products returned to original process without reclamation, and materials recycled/reused onsite. Materials that are not waste include reclaimed secondary materials returned to original process. In this context, all scrap metal including the copper filter should be properly recycled or reclaimed for scrap value, otherwise it must be disposed of in a hazardous waste (Class I) landfill or landfill authorized to accept certain types of hazardous waste by the Regional Water Quality Control Boards (e.g. Class II landfill), and never be discarded in the trash. Regardless of whether it is being recycled, scrap metal particularly the copper filter should be managed in a way that does not cause a release of its hazardous constituents to soil or surface water. It is therefore advised not throw away the dirty liquids into the soil or surface water but to dump all liquids in the sink or drainage system and rinse it out completely.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An air filter that has natural antimicrobial and self-sanitizing properties, the air filter has an air intake side and an air exit side, the air filter consisting of:
    a first intermediate layer;
    a second intermediate layer;
    a base filter layer, sandwiched between the first intermediate layer and the second intermediate layer;
    a post filter layer adjacent to the first intermediate layer and is on the air exit side;
    a prefilter layer is adjacent to the second intermediate layer, and is on the air intake side, and
    at least one porous copper layer removably coupled to the base filter layer and configured to capture suspended air particles passing through the at least one porous copper layer, wherein the at least one porous copper layer is configured to capture particles of 0.1 microns.

2. The air filter of claim 1, wherein the at least one porous copper layer is sintered, wherein tiny spheres of copper are pressed, heated, sintered, or bonded together.

3. The air filter of claim 1, wherein the at least one porous copper layer is open-cell copper foam compressed to achieve desired density and pore size of 100 pores per inch (PPI), wherein a thickness and number of layers in the open-cell copper foam is proportional to porosity.

4. The air filter of claim 1, wherein the at least one porous copper layer is sintered or non-sintered produced from non-woven copper fiber felt.

5. The air filter of claim 1, wherein the at least one porous copper layer is manufactured from powdered sintered porous copper media.

6. The air filter of claim 1, wherein the at least one porous copper layer is manufactured from a copper powder sintering process.

7. The air filter of claim 1, wherein the porous copper layer is present as pure or an alloy.

8. The air filter of claim 1, wherein the at least one porous copper layer is in a form of strands of copper fibers are pressed, heated, and bonded together to form a filter with randomized pore openings.

9. The air filter of claim 1, wherein the base filter layer is a high efficiency particulate air (HEPA) filter medium and the at least one porous copper layer is laminated to pleats of the HEPA filter medium.

10. A device comprising an air filter, wherein the air filter, the air filter has an air intake side and an air exit side, the air filter consisting of:
- a first intermediate layer;
- a second intermediate layer;
- a base filter layer, sandwiched between the first intermediate layer and the second intermediate layer;
- a post filter layer adjacent to the first intermediate layer and is on the air exit side;
- a prefilter layer is adjacent to the second intermediate layer, and is on the air intake side, and
- at least one porous copper layer removably coupled to the base filter layer and configured for capturing suspended air particles passing through the at least one porous copper layer for natural antimicrobial and self-sanitizing action.

11. The device of claim 10, wherein the device is a mechanical ventilator, the mechanical ventilator comprises a heat moisture exchanging filter or replaceable air filtering device.

12. The device of claim 10, wherein the device is a heating, ventilation, and air conditioning (HVAC)/Furnace, wherein the base filter layer is made of synthetic foam filter materials, wherein the at least one porous copper layer is made of open-cell copper foam.

13. The device of claim 10, wherein the device is a vehicle passenger cabin filtering device.

14. The device of claim 10, wherein the device is a media air cleaner.

15. The device of claim 10, wherein the device is a heating, ventilation, and air conditioning (HVAC) duct-mounted air purification system.

16. The device of claim 10, wherein the device is an air purifier.

17. A face mask or face portion of a provisional protective equipment (PPE) kit with an air filter, the air filter has an air intake side and an air exit side, the air filter consisting of:
- a first intermediate layer;
- a second intermediate layer;
- a base filter layer, sandwiched between the first intermediate layer and the second intermediate layer;
- a post filter layer adjacent to the first intermediate layer and is on the air exit side;
- a prefilter layer is adjacent to the second intermediate layer, and is on the air intake side, and
- at least one porous copper layer removably coupled to the base filter layer for capturing suspended air particles passing through the at least one porous copper layer for antimicrobial and self-sanitizing action, wherein the at least one copper layer is configured to capture particles of 0.1 microns.

* * * * *